April 12, 1927.  J. WILLIAMSON  1,624,299

LIGHTING FIXTURE

Filed July 31, 1924

Inventor:
James Williamson
By: Wm O Bell
Atty.

Patented Apr. 12, 1927.

1,624,299

UNITED STATES PATENT OFFICE.

JAMES WILLIAMSON, OF CHICAGO, ILLINOIS.

LIGHTING FIXTURE.

Application filed July 31, 1924. Serial No. 729,290.

This invention relates to electric lighting fixtures and more particularly to those which are suspended from the ceiling, but it will be apparent that the invention can be availed of in connection with wall fixtures with equally satisfactory results.

The object of the invention is to provide simple means for connecting a lighting fixture with the wiring installation so that the fixture will hang squarely even though the wiring may be carelessly installed or for any other reason the stud of the junction box is caused to project crookedly instead of at right angles to the ceiling or wall.

In wiring a building for electric lighting it is customary to install the conduits and junction boxes and other fixed parts during the early stages of erecting the building, before the plastering is done and the floors are laid. The wires may be run in the conduit at the time the latter are installed or at a later date. Sometimes in doing this work, which I will refer to generally as installing the electric wiring, and sometimes due to other building operations, or other causes, the junction boxes or other devices provided for attachment of the fixtures do not set squarely and fixtures attached thereto by ordinary means will hang crookedly and present a more or less unsightly appearance. The installer is tempted to and sometimes does twist or bend or force the parts of the wiring installation or parts of the fixture, which are not intended to be twisted or bent or forced, in an effort to make the fixture hang properly, and in so doing he will loosen or break or otherwise damage some of the parts. Since the connections are generally concealed by a canopy or the like whatever damage is done may not become apparent until some later time and then involve considerable repair expense or even result in more serious consequences.

I aim to provide means of simple construction which can be easily and readily employed for adapting the fixture to a crookedly installed wiring installation without injury to the fixture or the wiring installation and without requiring any special skill or training.

In the accompanying drawings illustrating a selected embodiment of the invention—

Figure 1:
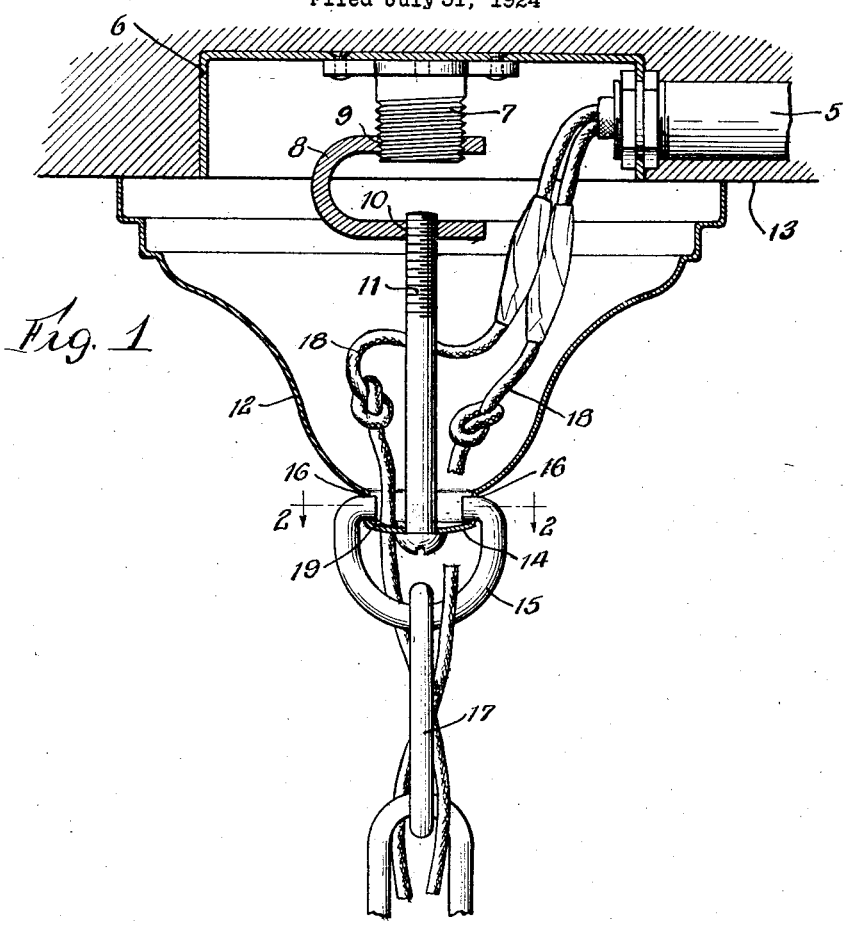
Fig. 1 is a sectional elevation showing the invention embodied in a ceiling fixture.
Figure 2:
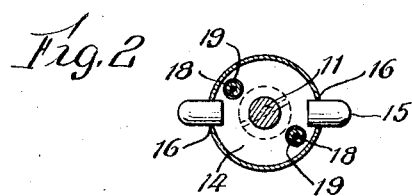
Fig. 2 is a transverse sectional view on the line 2—2 of Fig. 1.
Figure 3:
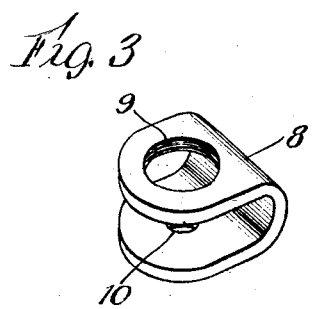
Fig. 3 is a detail perspective view of the yoke adapter.

Referring to the drawings, 5 designates a wiring conduit and 6 a junction box having an externally threaded stud 7. An adapter consisting of a plate bent U-shape in the form of a yoke 8 having one arm provided with a threaded opening 9 to receive the stud 7 and its other arm provided with a threaded opening 10 to receive the bolt 11. A one-piece canopy 12 is arranged over these parts and fits snugly against the ceiling 13, presenting a neat and ornamental appearance. The bolt 11 passes through the end of the tip 14 of the canopy and connects the canopy with the adapter yoke and the junction box stud to hold the parts securely together and the canopy clamped snugly and rigidly in engagement with the ceiling. A ring 15 has its ends bent and engaged with openings 16 in the tip of the canopy to carry the chain 17 and swing freely from the canopy. The conductor wires 18 extend through openings 19 in the end of the canopy tip alongside the head of the connecting bolt 11 and pass down through the chain being generally interlaced with the links thereof.

It is to be noted that the canopy has at its lower end a cylindrical tip as seen clearly in Figure 1, which tip extends below the side walls of the canopy proper and the openings for the conductor wires as well as the openings for the ends of the ring are formed entirely in the bottom and side walls of this tip below the junction of the side walls of the canopy therewith. By this means the support of the ring is entirely below the termination of the walls of the canopy proper and a much neater appearance is presented. The wires are disposed entirely within the confines of the tip and are not exposed in the least beyond the wall of the canopy proper.

The invention comprises only a few parts and these are of simple construction and can be made at comparatively low cost and easily and quickly installed without special skill or training. The adapter yoke may be of any desired size to accommodate different wiring installations and different fixtures, and a yoke of one size is capable of use in widely different installations and fixtures. This yoke is an adapter because it can be adjusted to any desired position about the stud and the connecting bolt and it can be bent to accommodate these parts in any angular relation they may bear to each other. Of course the yoke is made of sufficient strength to hold the fixture rigidly in fixed position but at the same time the arms can be spread apart or bent closer to each other as may be required to accommodate a junction box stud which projects at an improper angle with relation to the ceiling or wall. In this simple way the difficulties resulting from imperfect wiring installations can be easily overcome with very little additional labor and without special skill or damage to any parts. The ring 15 can be easily swung to one side to permit access to the head of the connecting bolt so that it can be inserted or removed, and the arrangement of the conductor wires through the end of the tip of the canopy avoids marring the body of the canopy and thereby promotes the general appearance of the fixture.

My invention can be embodied with any sort of wiring installation which provides a stud of any kind to be threadedly engaged by the adapter yoke. It can be engaged to an externally threaded crowfoot but I have not considered it necessary to illustrate the crowfoot because it is now being discarded and the installation illustrated is one most generally employed. However, a flexible tubing may be substituted for the conduit 5 and any other changes in the wiring installation may be made as desired. I do not limit myself to the particular construction and arrangement of parts herein shown and described because I know that many changes may be made in adapting the invention to different wiring installations and to different fixtures and I reserve the right to make all such changes as fall within the scope of the accompanying claims. The invention is simple in construction, it comprises but few parts, it can be manufactured economically and it can be easily applied and adjusted so that the lighting fixture always may be properly installed.

I claim:

1. The combination with a member of an electric wiring installation, as a junction box, for supporting a lighting fixture, of an adapter consisting of a plate bent U-shape in the form of a yoke with the bend extended outward from the ends of the arms and with the ends of said arms separated but disposed in parallel relation relatively close to each other, each of said arms having a screw threaded opening, one to receive a threaded adjusting bolt and the other for threaded engagement with a threaded stud of the junction box, one arm of the yoke being engaged with the member, a canopy having a tip with a closed end, a bolt threadedly engaged with the other arm of the adapter yoke and passing through said closed end of the canopy tip, the adapter being bendable to adjust the fixture relative to the member, and the head of the bolt engaging the closed end of the canopy tip to hold the canopy in place.

2. The combination of a hollow metal canopy having a truncated conical shape with its larger end open and a cylindrical tip at its lower end closed by an integral transverse plate, said tip being disposed entirely below the lower ends of the walls of the canopy proper, said tip having in its transverse plate, wholly within the confines thereof, a central opening and a pair of conductor wire openings, and a pair of diametrically located side openings in the vertical wall of said tip below its junction with the wall of the canopy, a supporting member, an elongated threaded bolt passing through the central opening and engaging said supporting member with the head of the bolt engaging the outer face of said plate, and a divided ring having its ends engaged with the said side openings below the lower end of the canopy proper.

JAMES WILLIAMSON.